US012212027B2

United States Patent
Weng et al.

(10) Patent No.: US 12,212,027 B2
(45) Date of Patent: Jan. 28, 2025

(54) HYDROGEN POWERED AUXILIARY POWER UNIT

(71) Applicant: Honeywell International Inc., Charlotte, NC (US)

(72) Inventors: Dacong Weng, Torrance, CA (US); Siamak Nikbin, Torrance, CA (US)

(73) Assignee: Honeywell International Inc., Charlotte, NC (US)

( * ) Notice: Subject to any disclaimer, the term of this patent is extended or adjusted under 35 U.S.C. 154(b) by 232 days.

(21) Appl. No.: 17/710,648

(22) Filed: Mar. 31, 2022

(65) Prior Publication Data
US 2023/0318002 A1    Oct. 5, 2023

(51) Int. Cl.
| | |
|---|---|
| *H01M 8/18* | (2006.01) |
| *B64D 31/00* | (2024.01) |
| *B64D 37/30* | (2006.01) |
| *H01M 8/04082* | (2016.01) |
| *H01M 8/10* | (2016.01) |
| *H01M 8/241* | (2016.01) |

(52) U.S. Cl.
CPC ............ *H01M 8/186* (2013.01); *B64D 31/00* (2013.01); *B64D 37/30* (2013.01); *H01M 8/04201* (2013.01); *H01M 8/241* (2013.01); *H01M 2008/1095* (2013.01); *H01M 2250/20* (2013.01)

(58) Field of Classification Search
CPC .. H01M 8/186; H01M 8/04201; H01M 8/241; H01M 2008/1095; H01M 2250/20; B64D 31/00; B64D 37/30
See application file for complete search history.

(56) References Cited

U.S. PATENT DOCUMENTS

| | | | |
|---|---|---|---|
| 7,128,624 B1 | 10/2006 | Goldmeer et al. | |
| 2005/0252214 A1 | 11/2005 | Goldmeer et al. | |
| 2006/0071630 A1 | 4/2006 | Dame et al. | |
| 2014/0093795 A1* | 4/2014 | Sone | H01M 8/186 |
| | | | 429/418 |
| 2018/0141674 A1 | 5/2018 | Bailey et al. | |
| 2019/0260056 A1* | 8/2019 | Yachi | H01M 8/04164 |
| 2020/0346776 A1* | 11/2020 | Vergnet | H01M 8/04925 |

OTHER PUBLICATIONS

"European Application Serial No. 23161819.0, Extended European Search Report mailed Aug. 2, 2023", 6 pgs.
"European Application Serial No. 23161819.0, Response filed Apr. 2, 2024 to Extended European Search Report mailed Aug. 2, 2023", 10 pgs.

* cited by examiner

*Primary Examiner* — Stewart A Fraser
(74) *Attorney, Agent, or Firm* — Schwegman Lundberg & Woessner, P.A.

(57) ABSTRACT

A system includes a reversible proton exchange membrane (PEM) fuel cell stack configured to receive oxygen and to controllably receive water and hydrogen, an electrical bus for coupling to a vehicle engine to receive electricity, the electrical bus coupled to the reversible fuel cell stack to controllably receive electricity from the fuel cell stack and provide electricity to the reversible fuel cell stack, and a hydrogen storage unit coupled to controllably receive hydrogen from the fuel cell stack, provide hydrogen to the fuel cell stack, and to provide hydrogen to a hydrogen gas powered electricity generator unit to couple to the electrical bus.

15 Claims, 4 Drawing Sheets

HYDROGEN POWERED AUXILIARY POWER UNIT

BACKGROUND

An auxiliary power unit (APU) may be used to provide electricity for vehicles when a primary source for electricity, such as an engine, is off-line. Such APUs are commonly used on aircraft to provide electricity to an aircraft while the aircraft is parked with the engines turned off. The engines are usually turned off while the aircraft are at the gate for safety reasons and to conserve fuel. Jet aircraft engines are also very loud. APUs generally utilize fossil fuel-based energy sources, which are viewed as not being environmentally favorable.

SUMMARY

A system includes a reversible proton exchange membrane (PEM) fuel cell stack configured to receive oxygen and to controllably receive water and hydrogen, an electrical bus for coupling to a vehicle engine to receive electricity, the electrical bus coupled to the reversible fuel cell stack to controllably receive electricity from the fuel cell stack and provide electricity to the reversible fuel cell stack, and a hydrogen storage unit coupled to controllably receive hydrogen from the fuel cell stack, provide hydrogen to the fuel cell stack, and to provide hydrogen to a hydrogen gas powered electricity generator unit to couple to the electrical bus.

A method includes in a first mode, receiving electrical energy from a vehicle engine by an electrical bus, providing electricity from the bus and water from a water tank to a reversible fuel cell stack operating in an electrolysis mode to generate hydrogen, transferring the generated hydrogen to a hydrogen tank, transferring hydrogen from the hydrogen tank to a hydrogen combustion electricity generator, and providing the generated electricity from the hydrogen combustion electricity generator to the electrical bus. In a second mode the method includes providing hydrogen from the hydrogen storage unit to the reversible fuel cell stack operating as an electricity generator to generate electricity, and providing the fuel cell stack generated electricity to the electrical bus.

A vehicle includes a vehicle engine, a reversible proton exchange membrane (PEM) fuel cell stack, a hydrogen storage unit coupled via a first hydrogen valve to receive hydrogen from the fuel cell stack and to provide hydrogen to the fuel cell stack, a hydrogen gas powered electricity generator coupled to controllably receive hydrogen from the hydrogen storage unit via a second hydrogen valve, a water tank coupled to provide water to the fuel cell stack, an electrical bus coupled to controllably receive electricity from the vehicle engine and to controllably provide electricity to or receive electricity from the fuel cell stack, and a controller coupled to control provision of water from the water tank to the reversible fuel cell stack, control provision of electricity to and from the electrical bus, and to control the first and second hydrogen valves.

DETAILED DESCRIPTION

Figure 1:
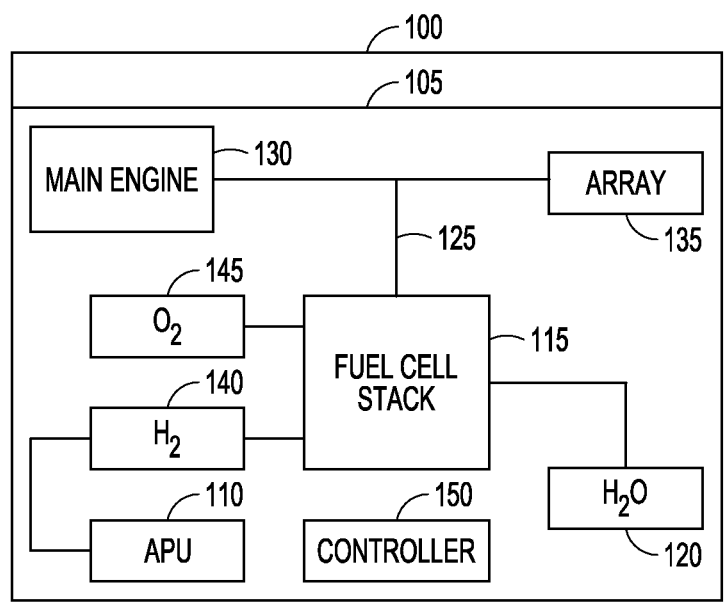
FIG. 1 is a block diagram of a vehicle that includes a system for generating and receiving electricity to generate hydrogen and store hydrogen for use in generating electricity according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

FIG. 1 is a block diagram of a vehicle 100 that includes a system for generating and receiving electricity to generate hydrogen and store hydrogen for use in generating electricity. Vehicle 100 may be an aircraft or other type of vehicle. System 105 includes a hydrogen powered auxiliary power unit (APU) 110. In one example, a Honeywell HPS799 APU may have its combustor and fuel delivery system modified to utilize hydrogen as fuel.

Hydrogen to operate the APU may be generated by a reversible proton exchange membrane (PEM) based fuel cell stack 115 using water 120 and electricity via an electrical bus 125 from a main engine 130 or optional photovoltaic solar array 135. One example PEM that may be used for forming the fuel cell stack 115 is the reversible PEM fuel cell stack from an M Series Containerized PEM Electrolyzer with a hydrogen production rate of 246-492 Nm$^3$/hour at conditions of 0° C. and 1 atmosphere available from Nel ASA of Norway. The hydrogen (H2) may be stored in a hydrogen storage unit 140, such as a tank capable of holding pressurized hydrogen. The system 105 is environmentally friendly for APU operation as the byproduct generated from operation of the APU is water, a 100% carbon-free emission. No fossil-fuel need be used.

The reversible proton exchange membrane (PEM) fuel cell stack 115 can be operated under dual modes. An electrolysis mode produces hydrogen from water for APU 110 operation. A fuel cell mode generates electricity from hydrogen for use by components of the vehicle system 100. Because the reversible PEM fuel cell stack 115 can generate hydrogen at high pressure (examples of high pressure may range up to 3,000 PSI to 5,000 PSI for various fuel cell stack designs.) A hydrogen compressor may optionally be used for further compressing hydrogen generated in electrolysis mode for storage in hydrogen storage unit 140.

The reversible PEM fuel cell stack 115 can start instantaneously at ambient temperature to generate pure hydrogen or electricity. As an option, the oxygen generated at an anode side of the reversible PEM fuel cell stack can be stored in an oxygen tank 145 and used for cabin environmental control or as a pure oxygen source for improved power generation by the reversible PEM fuel cell stack 115.

The vehicle 100 may be an aircraft in one example. The engine 130 may be a jet or motor for driving a propeller and includes the ability to generate electrical power. During normal operation under control of a programmed controller 150, the hydrogen gas turbine APU 110 provides electrical power to start one or more engines 130 by combusting hydrogen stored in the hydrogen storage unit 140.

The hydrogen storage unit 140 may be refilled by the reversible PEM fuel cell stack 115 during a flight. The engine 130 generate electricity to operate the fuel cell stack 115 in electrolysis mode. The reversible PEM fuel cell stack electrochemically converts water from water tank 120 to oxygen and hydrogen by consuming electricity generated from the engine 130 or the optional on board photovoltaic solar array or arrays 135.

The stored hydrogen can also be used by the reversible PEM fuel cell stack 115, along with oxygen from ambient or from oxygen tank 145 to generate quiet and clean power for ground operation when main engines are shut down. This is true 100% of carbon-free power generation since the only byproduct is water during the fuel stack mode of operation.

Figure 2:
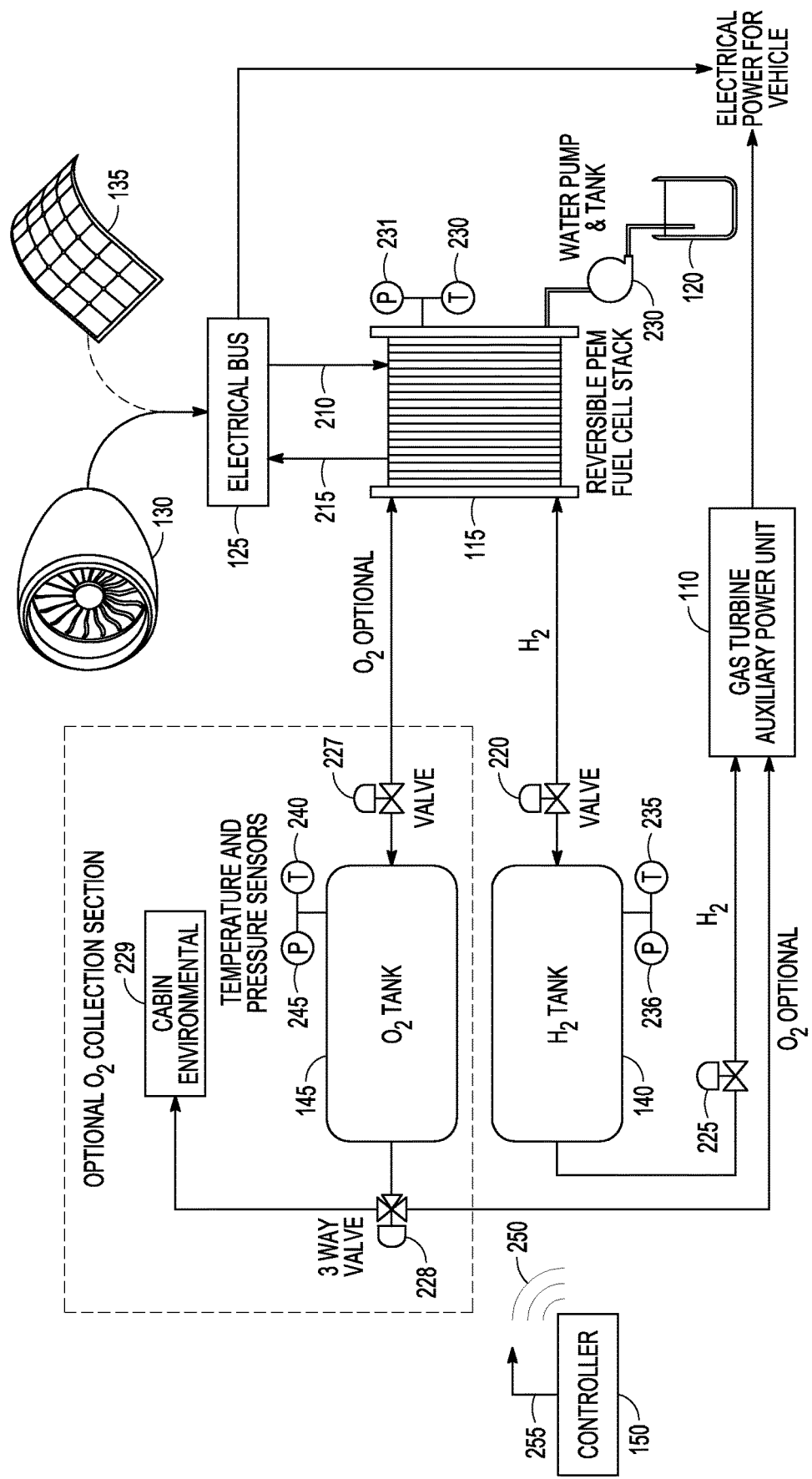
FIG. 2 is a block schematic diagram of a system providing further operational detail for providing power for a vehicle according to an example embodiment.

FIG. 2 is a block schematic diagram of a system 200 providing further operational detail for providing power for a vehicle such as an aircraft and using like reference numbers for like components in FIG. 1. Engine 130 and optional solar array 135 are coupled to electrical bus 125 to provide electrical power. Engine 130 may also receive electrical power from electrical bus 125. Reversible proton exchange membrane (PEM) fuel cell stack is coupled to the electrical bus 125 as indicated at conductor 210 to receive electricity to operate in electrolysis mode and at conductor 215 to provide electricity to the bus, acting as a power source.

The hydrogen storage unit 145 is coupled via a first hydrogen valve 220 to receive hydrogen from the fuel cell stack 115 and to provide hydrogen to the fuel cell stack 115. The fuel cell stack provides hydrogen to the hydrogen storage unit 140 at a first pressure higher than ambient pressure. The hydrogen gas powered electricity generator 110 is coupled to controllably receive hydrogen from the hydrogen storage unit 140 via a second hydrogen valve 225. The water tank 120 is coupled via a pump 230 to provide water to the fuel cell stack 115 and may also receive water generated from the fuel cell stack 115 while operating in fuel cell mode.

The oxygen tank may be coupled via a first oxygen valve 227 to the fuel cell stack 115 and via a second oxygen valve 228 to the gas turbine 110 and optionally cabin environmental controls indicated at 229. Valve 228 may be a three-way valve in one example.

The controller 150 is coupled to control the pump 230 to provide water from the water tank 120 to the fuel cell stack 115, control the electrical bus 125 to selectively provide electricity to the fuel cell stack 114, and control the first and second hydrogen valves 220 and 225 as well as first and second oxygen valves 227 and 228. The controller may also receive information from the engine 130 or array 135 to determine which mode to place the fuel cell stack, thereby determining the correct controls for various valves and the pump. In one example, the mode may switch depending on whether electricity is being generated, or even in response to user instructions, such a pilot or ground support using a user interface or mode switch. The controller may be hard wired to the components it received information from or connected wirelessly as indicated at 250. Wired connections 255 are not shown for ease of illustration.

Various temperature and pressure sensors may also be coupled to provide information to the controller 150. The fuel cell stack 115 may include one or more temperature and pressure sensors indicated at 230 and 231. Similarly, the hydrogen storage unit 140 and oxygen tank 145 may also include one or more respective temperature and pressure sensors indicated at 235, 236 and 240, 241.

Figure 3:
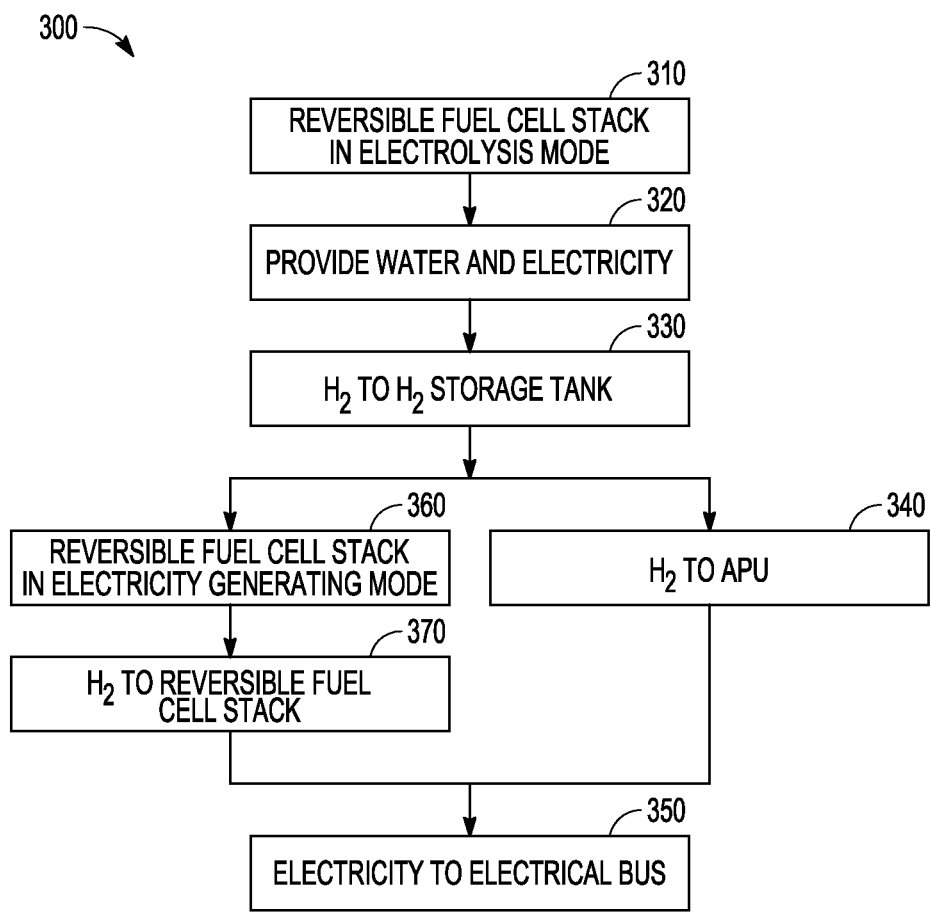
FIG. 3 is a flowchart illustrating a controller implemented method for controlling operation of the system of FIG. 2 according to an example embodiment.

FIG. 3 is a flowchart illustrating a controller implemented method 300 for controlling operation of system 200. Method 300 may begin with the fuel cell stack operating in a first mode, referred to as an electrolysis mode at operation 310 by receiving electrical energy from the vehicle engine 130 via the electrical bus 125. This mode may be entered while the engine 130 is detected as on and generating electricity, or otherwise as desired. The controller controls pump 230 to pump water from water tank 120 into the fuel cell stack at operation 320, and controls first hydrogen valve 220 to allow generated hydrogen to flow from the fuel cell stack to the hydrogen storage unit 220 at operation 330. Conductor 210 is held in a conducting state, while conductor 215 may be placed into an open circuit configuration since no electricity will be generated by the fuel cell stack in this first mode.

At operation 340, hydrogen is transferred from the hydrogen tank 140 to the APU 110, also referred to as a hydrogen combustion electricity generator, to generate electricity. In one example operation 340 is not performed until the engine 130 is shut down. The generated electricity from the hydrogen combustion electricity generator is transferred at operation 350 to the electrical bus.

In a second mode starting at 360, referred to as an electricity generating fuel cell mode, hydrogen is provided at operation 370 from the hydrogen storage unit to the reversible fuel cell stack to generate electricity. In one example operation 360 is not performed until the engine 130 is shut down. The fuel cell stack generated electricity is provided to the electrical bus at operation 350. The method 300 may revert back to the electrolysis mode 310 in response to the engine 130 no longer generating electricity or as otherwise desired. In further examples, one or both of operations 340 and 360 may be performed while the engine 130 is no longer generating electricity.

Method 300 may also include providing oxygen from the reversible fuel cell stack operating in the first mode to the oxygen tank, or alternatively providing oxygen from the oxygen tank to the reversible fuel cell stack operating in the second mode. Providing oxygen to the reversible fuel cell stack operating in the second mode may be helpful at high altitudes or other environments when ambient conditions to not provide sufficient oxygen to allow the fuel cell stack to generate sufficient electricity.

Method 300 may also include providing oxygen from the oxygen tank to the vehicle cabin coupled to the oxygen tank via a controllable oxygen valve to receive oxygen from the oxygen tank. Alternatively, the oxygen may be provided to the hydrogen combustion electricity generator.

Figure 4:
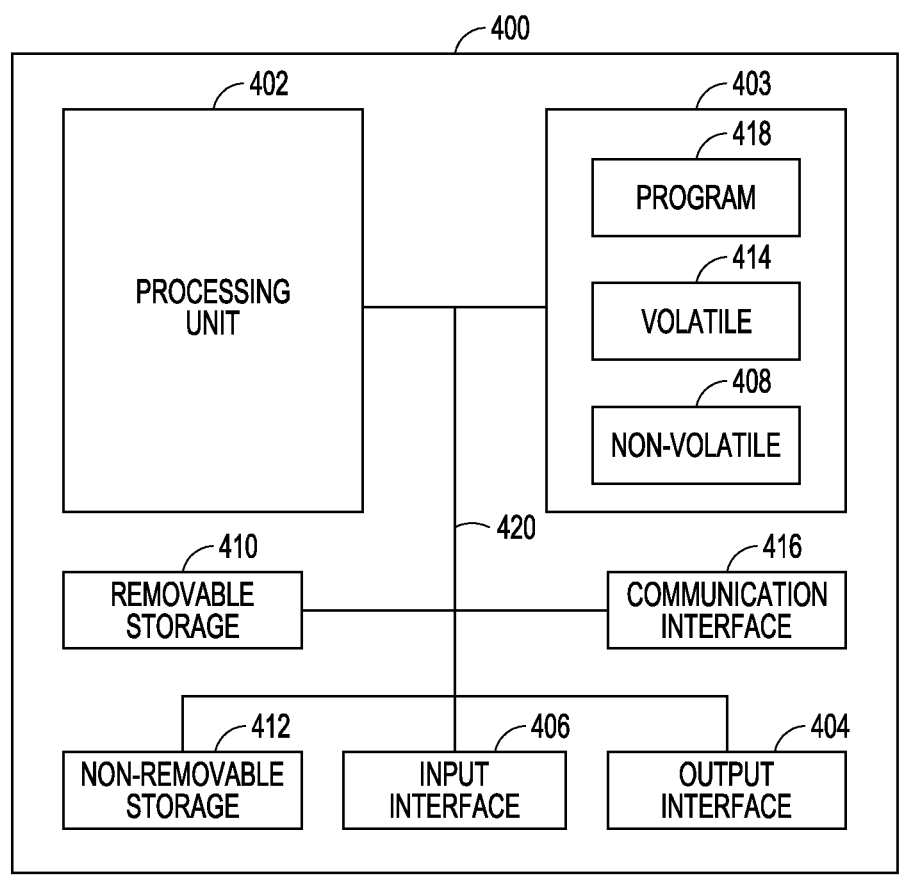
FIG. 4 is a block schematic diagram of a computer system to implement one or more example embodiments.

FIG. 4 is a block schematic diagram of a computer system 400 to implement the controller 150 and for performing methods and algorithms according to example embodiments. All components need not be used in various embodiments.

One example computing device in the form of a computer 400 may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, smart storage device (SSD), or other computing device including the same or similar elements as illustrated and described with regard to FIG. 4. Devices, such as smartphones, tablets, and smartwatches, are generally collectively referred to as mobile devices or user equipment.

Although the various data storage elements are illustrated as part of the computer 400, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input interface 406, output interface 404, and a communication interface 416. Output interface 404 may include a display device, such as a touchscreen, that also may serve as an input device. The input interface 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 418 along with the workspace manager 422 may be used to cause processing unit 402 to perform one or more methods or algorithms described herein.

EXAMPLES

1. A system includes a reversible proton exchange membrane (PEM) fuel cell stack configured to receive oxygen and to controllably receive water and hydrogen, an electrical bus for coupling to a vehicle engine to receive electricity, the electrical bus coupled to the reversible fuel cell stack to controllably receive electricity from the fuel cell stack and provide electricity to the reversible fuel cell stack, and a hydrogen storage unit coupled to controllably receive hydrogen from the fuel cell stack, provide hydrogen to the fuel cell stack, and to provide hydrogen to a hydrogen gas powered electricity generator unit to couple to the electrical bus.

2. The system of example 1 and further including a controller coupled to control the operation of the reversible PEM fuel cell stack to generate electricity from hydrogen and oxygen or to generate hydrogen from electricity and water.

3. The system of example 2 wherein the controller controls the hydrogen storage unit to provide hydrogen to the fuel cell stack, provide hydrogen to the hydrogen gas powered unit for combustion, or receive hydrogen from the fuel cell stack.

4. The system of any of examples 1-3 wherein vehicle engine includes an aircraft engine to propel a vehicle and generate electricity.

5. The system of any of examples 1-4 wherein the system includes an aircraft that includes an electrical system coupled to receive electricity from the electrical bus.

6. The system of any of examples 1-5 and further including an oxygen tank coupled to controllably provide oxygen to the reversible fuel cell stack or receive oxygen from the fuel cell stack.

7. The system of example 6 and further including a vehicle cabin coupled to the oxygen tank via a controllable oxygen valve to receive oxygen from the oxygen tank.

8. The system of example 7 wherein the oxygen valve includes a three-way valve coupled between the oxygen tank, the vehicle cabin, and the hydrogen gas powered electricity generator.

9. The system of any of examples 1-8 and further including a first hydrogen valve coupled between the hydrogen storage unit and the reversible fuel cell stack to control hydrogen flow to and from the reversible fuel cell stack.

10. The system of example 9 wherein the reversible fuel cell stack is coupled to provide hydrogen to the hydrogen storage unit at a first pressure higher than ambient pressure.

11. The system of any of examples 9-10 and further including a second hydrogen valve coupled to control hydrogen flow to the hydrogen gas powered electricity generator unit.

12. The system of any of examples 1-11 and further including a water tank coupled to the fuel cell stack via a pump to provide water to the fuel cell stack.

13. The system of any of examples 1-12 and further including a solar panel electrically coupled to the electrical bus.

14. A method includes in a first mode, receiving electrical energy from a vehicle engine by an electrical bus, providing electricity from the bus and water from a water tank to a reversible fuel cell stack operating in an electrolysis mode to generate hydrogen, transferring the generated hydrogen to a hydrogen tank, transferring hydrogen from the hydrogen tank to a hydrogen combustion electricity generator, and providing the generated electricity from the hydrogen combustion electricity generator to the electrical bus. In a second mode the method includes providing hydrogen from the hydrogen storage unit to the reversible fuel cell stack operating as an electricity generator to generate electricity, and providing the fuel cell stack generated electricity to the electrical bus.

15. The method of example 14 and further including providing oxygen from the reversible fuel cell stack operating in the first mode to an oxygen tank and providing oxygen from the oxygen tank to the reversible fuel cell stack operating in the second mode.

16. The method of example 15 and further including providing oxygen from the oxygen tank to a vehicle cabin coupled to the oxygen tank via a controllable oxygen valve to receive oxygen from the oxygen tank.

17. The method of example 16 and further including providing oxygen from the oxygen tank to the hydrogen combustion electricity generator.

18. A vehicle includes a vehicle engine, a reversible proton exchange membrane (PEM) fuel cell stack, a hydrogen storage unit coupled via a first hydrogen valve to receive hydrogen from the fuel cell stack and to provide hydrogen to the fuel cell stack, a hydrogen gas powered electricity generator coupled to controllably receive hydrogen from the hydrogen storage unit via a second hydrogen valve, a water tank coupled to provide water to the fuel cell stack, an electrical bus coupled to controllably receive electricity from the vehicle engine and to controllably provide electricity to or receive electricity from the fuel cell stack, and a controller coupled to control provision of water from the water tank to the fuel cell stack, control provision of electricity to and from the electrical bus, and to control the first and second hydrogen valves.

19. The system of example 18 and further including an oxygen tank coupled to controllably provide oxygen to the fuel cell stack or receive oxygen from the fuel cell stack and to provide oxygen to the hydrogen gas powered electricity generator.

20. The system of any of examples 18-19 and further including a pump coupled between the water tank and the fuel cell stack.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
a reversible proton exchange membrane (PEM) fuel cell stack configured to receive oxygen and to controllably receive water and hydrogen;
an electrical bus for coupling to a vehicle engine to receive electricity, the electrical bus coupled to the reversible fuel cell stack to controllably receive electricity from the fuel cell stack and provide electricity to the reversible fuel cell stack; and
a hydrogen storage unit coupled to controllably receive hydrogen from the fuel cell stack, provide hydrogen to the fuel cell stack, and to provide hydrogen to a hydrogen gas powered electricity generator unit coupled to the electrical bus.

2. The system of claim 1 and further comprising a controller coupled to control the operation of the reversible PEM fuel cell stack to generate electricity from hydrogen and oxygen or to generate hydrogen from electricity and water.

3. The system of claim 2 wherein the controller controls the hydrogen storage unit to provide hydrogen to the fuel cell stack, provide hydrogen to the hydrogen gas powered unit for combustion, or receive hydrogen from the fuel cell stack.

4. The system of claim 1 wherein vehicle engine comprises an aircraft engine to propel a vehicle and generate electricity.

5. The system of claim 1 wherein the system comprises an aircraft that includes an electrical system coupled to receive electricity from the electrical bus.

6. The system of claim 1 and further comprising an oxygen tank coupled to controllably provide oxygen to the reversible fuel cell stack or receive oxygen from the fuel cell stack.

7. The system of claim 6 and further comprising a vehicle cabin coupled to the oxygen tank via a controllable oxygen valve to receive oxygen from the oxygen tank.

8. The system of claim 7 wherein the oxygen valve comprises a three-way valve coupled between the oxygen tank, the vehicle cabin, and the hydrogen gas powered electricity generator.

9. The system of claim 1 and further comprising a first hydrogen valve coupled between the hydrogen storage unit and the reversible fuel cell stack to control hydrogen flow to and from the reversible fuel cell stack.

10. The system of claim 9 wherein the reversible fuel cell stack is coupled to provide hydrogen to the hydrogen storage unit at a first pressure higher than ambient pressure.

11. The system of claim 9 and further comprising a second hydrogen valve coupled to control hydrogen flow to the hydrogen gas powered electricity generator unit.

12. The system of claim 1 and further comprising a water tank coupled to the fuel cell stack via a pump to provide water to the fuel cell stack.

13. The system of claim 1 and further comprising a solar panel electrically coupled to the electrical bus.

14. A system comprising:
a reversible proton exchange membrane (PEM) fuel cell stack configured to receive oxygen and to controllably receive water and hydrogen;

an electrical bus for coupling to a vehicle engine to receive electricity, the electrical bus coupled to the reversible fuel cell stack to controllably receive electricity from the fuel cell stack and provide electricity to the reversible fuel cell stack; and a hydrogen storage unit coupled to controllably receive hydrogen from the fuel cell stack, provide hydrogen to the fuel cell stack, and to provide hydrogen to a hydrogen gas powered electricity generator unit coupled to provide electrical power to the electrical bus.

15. The system of claim 14 wherein the fuel cell stack provides hydrogen to the hydrogen storage unit at a pressure of at least 3,000 PSI.

* * * * *